United States Patent [19]

Pugsley

[11] 4,346,402

[45] Aug. 24, 1982

[54] IMAGE-REPRODUCTION APPARATUS

[75] Inventor: Peter C. Pugsley, Pinner, England

[73] Assignee: Crosfield Electronics Limited, London, England

[21] Appl. No.: 154,168

[22] Filed: May 28, 1980

[30] Foreign Application Priority Data

May 30, 1979 [GB] United Kingdom ............... 7918806

[51] Int. Cl.³ .............................................. G03F 3/08
[52] U.S. Cl. ...................................... 358/80; 355/38; 355/77
[58] Field of Search ........................ 355/3 R, 4, 38, 77; 358/256, 300, 302, 80

[56] References Cited

U.S. PATENT DOCUMENTS

| 2,969,709 | 1/1961 | Zeyen et al. | 355/38 X |
| 3,519,347 | 7/1970 | Bowker et al. | 355/38 X |
| 3,541,245 | 11/1970 | Wilby | 358/280 |
| 3,663,110 | 5/1972 | Rising | 355/38 X |
| 3,761,183 | 9/1973 | Yuasa et al. | 355/38 X |
| 4,058,828 | 11/1977 | Ladd | 358/80 |
| 4,075,662 | 2/1978 | Gall | 358/302 X |
| 4,110,795 | 8/1978 | Spencer | 358/256 X |
| 4,154,523 | 5/1979 | Rising et al. | 355/77 X |
| 4,168,120 | 9/1979 | Freier et al. | 355/38 |

FOREIGN PATENT DOCUMENTS 1166091 10/1969 United Kingdom.

Primary Examiner—Fred L. Braun
Attorney, Agent, or Firm—Sughrue, Mion, Zinn, Macpeak and Seas

[57] ABSTRACT

A color scanner for the graphic arts of the kind in which three uncorrected color-component analogue signals from the scanner are converted into digital form and are applied to the inputs of a three-dimensional look-up table or read-only memory in which are stored corresponding color-corrected signal values for the three colors and, if desired, for black. Individual one-dimensional color-component look-up tables are interposed between the analogue-digital converter and the three-dimensional look-up table. The functions performed by the one-dimensional tables may include logarithmic conversion of the input signals, for example. Preferably, further individual one-dimensional look-up tables are inserted between the outputs of the three-dimensional table and a digital-analogue converter preceding an output scanner.

9 Claims, 1 Drawing Figure

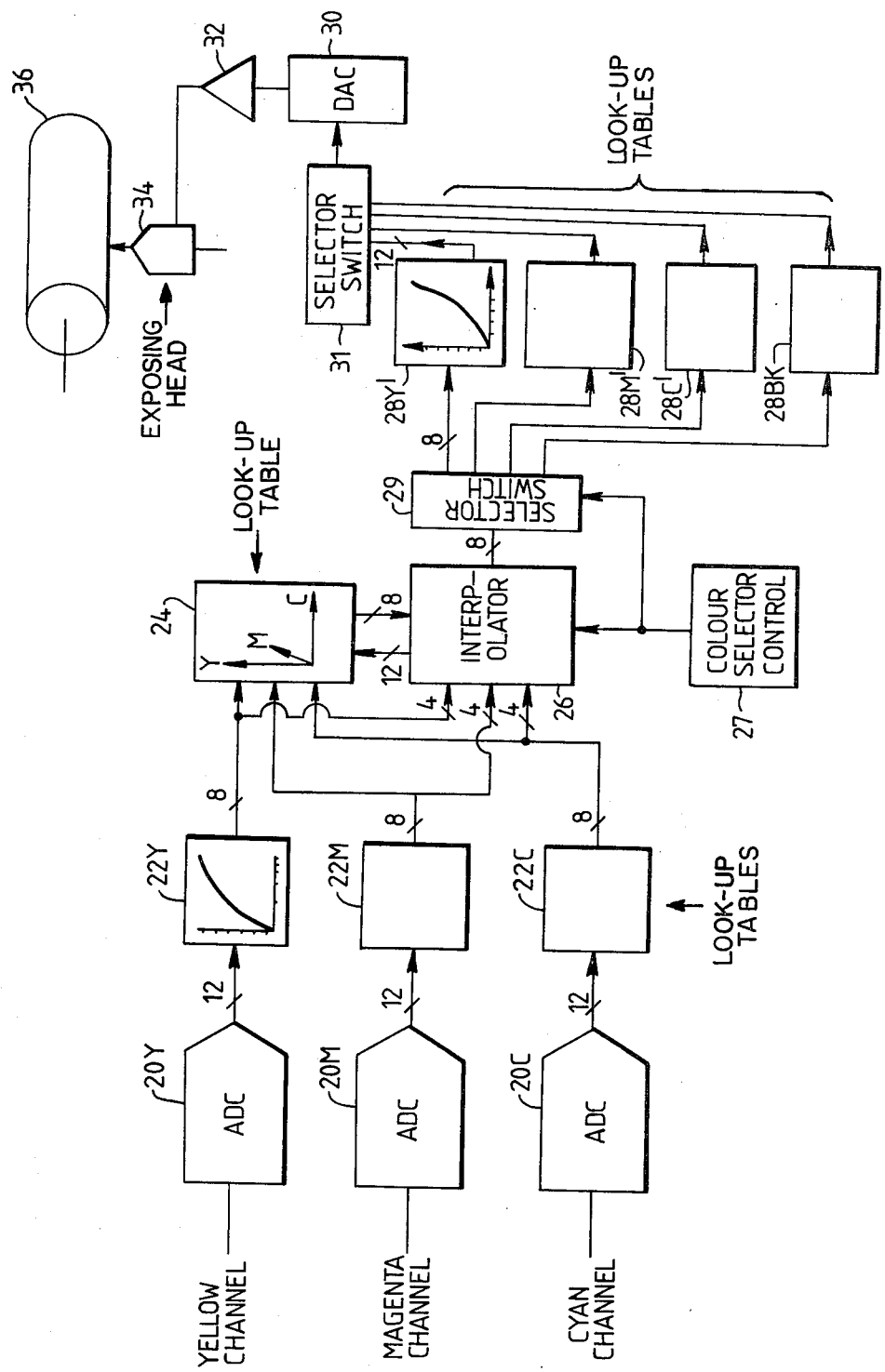

IMAGE-REPRODUCTION APPARATUS

In a colour scanner for the graphic arts some form of adjustable computer is required to convert signals derived from the scanner photomultipliers or photocells into signals which, when applied to the output means of the scanner, will give rise to colour separations or plates which will result in a printed image which is an acceptable reproduction of the original subject. To this end the computer must modify the signals in a manner which takes into account the characteristics of the input and output means of the scanner, the tone or gradation curve appropriate to the particular subject to be scanned, the absorbtions and printing characteristics of the ink, and the editorial modifications to the original subject which may on occasion be required.

The corrections required are however, complicated functions and are not all independent of one another; instead they interact and this makes it difficult to provide for an operator to make adjustments as required for a particular subject or for editorial reasons. Also, the more complicated the functions provided in the correction circuits, the less stable are these circuits.

In recent years, the modified analogue signals, have been converted into digital form in order to permit storage of these signals without losing the image quality in the final reproduction. The signals are extracted from store as required to expose or otherwise treat an output surface. Such storage permits, for example, enlarging by the method described in commonly assigned British Pat. No. 1,166,091. Of course, when signals are converted to digital form it is necessary to provide a large number of digital or "quantising" levels, because if the steps between levels are too great the transitions between two adjacent quantising levels will be visible on a finished picture as undesirable contours. The number of levels cannot be increased indefinitely for reasons of storage capacity. The number required can be somewhat reduced by superimposing noise upon the signals.

Because of the difficulty of setting up and maintaining the analogue corrections referred to above and of providing adjustment that an average operator can manage, it was suggested in commonly assigned British Pat. No. 1,369,702 that the correction should be carried out by means of a digitally operating look-up table; a store was provided with a matrix of colour and tone corrected output values responding to a matrix of colour-component input signal combinations, each representing a point in colour space; these values were loaded in advance of the image-reproducing operation and took into account the modifications required by an operator for the particular work in hand; image-representing signals derived from photomultipliers in the analysing head as it scanned the image to be reproduced were then converted to digital form and were applied to the "look-up table" constituted by the above-mentioned store to derive the required corrected values at the store output. For the preliminary loading of the store with the matrix of output values, parameter values were set up in accordance with the system characteristics and the characteristics of the original to be reproduced. These values were entered into a digital computer programmed to provide the required output-input relationship and, for example, to derive a black printer signal and remove "undercolour" from the colour-component signals.

The use of a digital "look-up" table of this kind gave the advantage of stability in the correction system and overcame the interaction problems. It also facilitated the setting up of the image reproducing apparatus to reproduce a particular image.

However, because all changes of gradation must be performed within a single table, a lack of resolution is experienced in the picture data.

In this specification, the term "uncorrected colour separation signal" is intended to mean a colour separation signal which has not been substantially modified as a function of at least one other colour separation signal to take into account the characteristics of the printing inks and the term "corrected colour separation signal" is intended to mean a colour separation signal which has been so modified.

In a method according to the present invention for the production of colour-separated and colour-corrected images from a coloured original, the original is electro-optically scanned to produce uncorrected colour separation signals which are then converted into digital form; thereafter, each uncorrected colour separation signal is applied to a separate first signal-varying means including an individual digitally stored first look-up table, these first signal-varying means providing signals which have been modified substantially independently of one another; thereafter the modified uncorrected colour separation signals are applied to a further signal-varying means including a digitally stored look-up table to obtain corrected colour separation signals, each of which is a function of two or more of the modified uncorrected colour separation signals; from the corrected signals there are derived output signals for application to one or more output devices by means of which each colour corrected colour separation image is recorded on a recording medium.

In the preferred form of apparatus embodying the invention, each corrected colour separation signal obtained from the further signal-varying means is applied to an output signal-varying means including an individual digitally stored look-up table which further modifies the corrected colour separation signal applied thereto, the further modified signal being used to control the output device.

Each signal-varying means may be constituted by a look-up table operating in an absolute mode or by an incremental look-up table and an adder.

It is an important subsidiary feature of the invention that a larger number of bits is used for the signal immediately following analogue-digital conversion and a smaller number at the output of the first look-up tables. Likewise where the above-mentioned output look-up tables are used a smaller number of bits is used at the input to these final look-up tables and a larger number at the output.

Thus, the first look-up tables may provide a linear-to-logarithmic transformation, converting the linear representation of transmittance or reflectance of the original to a density representation quantised in approximately uniform subjective steps, the density being the desired print density of the reproduction formed by overprinting all the colour corrected colour separation images, as measured through an appropriate colour filter. In practice it is a transformation to an approximately logarithmic form, the curve used providing a better representation of subjectively equal steps of relative luminosity than a true logarithmic curve would provide. An example of such a curve is given by A. J. Johnson, PIRA Report No. PR 143, "A Study of Preferred Tone Reproduction Characteristics for Colour Reproduction"

(FIG. 17, Quadrant 1). References in this specification to logarithmic forms should be taken to include such approximate logarithmic forms. A correction may also be incorporated to balance the tracking of the three photomultipliers. The output look-up tables, which are in general different for each channel, may convert the corrected colour separation signals to print density signals such that when the signals are used to control the output device the desired ink density will ultimately be printed.

The invention also consists in apparatus for carrying out the method defined above.

If desired, some analogue signal processing may be carried out in each colour separation channel, before analogue-to-digital conversion takes place. Thus, for example the logarithmic conversion or shadow compression may be introduced in this way. Also, some linear or non-linear cross-coupling between channels may take place before analogue-to-digital conversion, to provide compensation for defects in the separating filters.

In order that the invention may be better understood, an example of apparatus embodying the invention will now be described with reference to the accompanying drawing.

In the drawing, the picture signals (yellow, magenta, cyan) from the photomultipliers are applied to analogue-to-digital conversion circuits 20 and the resulting digital signals in 12-bit form are applied to first look-up tables 22 which provide the linear-to-logarithmic transformation. The resulting digital signals in the logarithmic range comprises 8 bits. These logarithmic signals are applied to a look-up table 24 representing 3-dimensional colour space and also to an interpolator 26 connected to the table 24 and carrying out a function similar to that described in British Pat. No. 1,369,702. The table 24 and the interpolator 26 correct for defects in printing ink colours, generate the black separation signals, and carry our under-colour removal. It should be understood that the table 24 is really four independent 3-dimensional look-up tables, since at each input address four separate values for the four output colours are found. The colour separation signals are derived from the table 24 and interpolator 26 one colour at a time, under the control of a colour selector control unit 27. A train of 8-bit control signals representing the selected colour component is applied through a selector switching circuit to the appropriate one of four output look-up tables 28. Thus, assuming that the corrected yellow signal is provided at the output of the interpolator 26, this signal will be applied to the look-up table 28Y'.

Each table 28 is of one-dimensional form and converts transparency density to print density. The output of table 28 is in 12-bit form, allowing for a gain change of sixteen without loss of resolution. The 12-bit signal from the selected table 28 is then applied through a selector switch 31 to a digital-to-analogue converter 30 and thence through modulator amplifier 32 to control a light source in exposing head 34 which exposes a light-sensitive surface on the cylinder 36.

Generally speaking, the first look-up tables will be reloaded to suit each individual coloured original. The 3-dimensional table 24 primarily corrects for ink characteristics and needs to be changed only when an individual coloured original requires some special alteration. Each output look-up table corrects for the characteristics of the output device, recording medium and press, and needs to be modified only when one of these is changed.

The apparatus described above permits changes in range and colour bias between one original and the next to be dealt with without re-computing the 3-dimensional look-up table. The 3-dimensional table 24 has 4096 entries, whereas each 1-dimensional table 22 has only 256 distinct entries corresponding to the 8-bit output, these being appropriately replicated to fill the 4096 entries of the table. Thus the process of re-computing input look-up tables is 4 times faster than that of re-computing the main 3-dimensional table. In addition, the configuration described above enables an input resolution from the analogue system of 12 bits without expanding the 3-dimensional look-up table to an unreasonable size. This makes it practical to simplify the analogue signal processing by omitting "logging" stages, (stages converting the signal to logarithmic form), which are generally a source of trouble in achieving stability and accuracy. A somewhat similar argument applies in respect of advantages obtained by the use of 8 bit to 12 bit output look-up tables.

In the above description, it has been assumed that the black printer is generated in the same manner as the colour separation printers, having its own output from the look-up table 24 and interpolator 26 and its own final look-up table 28. In an alternative and more economical way of generating the black printer, hard-wired logic is used to select the smallest of the three signals emerging from the first look-up tables 22 and the smallest signal is transferred directly to a black output look-up table (one-dimensional), the output of which provides the signal for exposing the black printer. This has the advantage that the look-up table 24 and interpolator 26 need only generate three signals instead of four.

A disclosure of the general arrangement of the analysing and recording scanners and of the circuits for controlling the operation of the scanners is given in U.S. Pat. No. 3,541,245.

I claim:

1. A method for the production of colour-separated and colour-corrected images from a coloured original, including electro-optically scanning the original to produce uncorrected colour separation signals which are then converted into digital form, comprising the steps of:

individually applying the uncorrected colour separation signals to separate first signal-varying means each including a digitally stored first look-up table, said first signal-varying means providing signals which have been modified substantially independently of one another;

thereafter applying the modified uncorrected colour separation signals to a further signal-varying means including a digitally stored look-up table to obtain corrected colour separation signals, each of which is a function of two or more of the modified uncorrected colour separation signals; and from the corrected signals, deriving output signals for application to one or more output devices by means of which each colour corrected colour separation image is recorded on a recording medium.

2. A method in accordance with claim 1, comprising applying each corrected colour separation signal obtained from the colour-correcting signal-varying means to an output signal-varying means including an individual digitally stored look-up table which further modifies the corrected colour separation signal applied thereto, the further modified signal being used to control the output device.

3. Apparatus for the production of colour-separated and colour-corrected images from a coloured original, including an electro-optical scanner for producing uncorrected colour separation signals corresponding to successively scanned elements of the original, comprising:
- a plurality of analogue-to-digital converters for individually converting the signals into digital form;
- a plurality of separate first signal-varying means, each including a digitally stored first look-up table, connected to individually receive the uncorrected colour separation signals, said first signal-varying means providing signals which have been modified substantially independently of one another;
- colour-correcting signal-varying means connected to receive the modified uncorrected colour separation signals, the colour-correcting signal-varying means including a digitally stored look-up table for providing colour-corrected colour separation signals, each of which is a function of two or more of the modified uncorrected colour separation signals; and
- means for deriving from the colour-corrected signals, output signals for application to one or more output devices by means of which each colour-corrected colour-separation image is recorded on a recording medium.

4. Apparatus in accordance with claim 3, further comprising a separate output signal-varying means for each corrected colour separation signal obtained from the colour-correcting signal-varying means, each output signal-varying means including an individually digitally stored look-up table which further modifies the corrected colour separation signal applied thereto, the further modified signal being used to control the output device.

5. Apparatus in accordance with claim 3 or 4, in which the look-up tables operate in an absolute mode.

6. Apparatus in accordance with claim 3 or 4, in which the look-up tables operate in an incremental manner.

7. Apparatus in accordance with claim 3 in which a number of bits used for the signal immediately following analogue-digital conversion is greater than the number of bits used for the signal at the output of the first look-up tables.

8. Apparatus in accordance with claim 4, in which the number of bits used at the input to the output look-up tables is smaller than the number of bits obtained at the output.

9. Apparatus in accordance with claim 3, in which the first look-up tables provide a linear-to-logarithmic transformation, converting the linear representation of transmittance or reflectance of the original to a density representation.

* * * * *